(12) United States Patent
Chang (10) Patent No.: US 10,599,232 B2
(45) Date of Patent: Mar. 24, 2020

(54) WIRELESS CHARGING MOUSE, WIRELESS CHARGING MOUSE DEVICE AND CHARGING METHOD THEREOF

(71) Applicants: DEXIN ELECTRONIC LTD., Donggaun Guangdong (CN); DEXIN CORPORATION, New Taipei (TW)

(72) Inventor: Yuan-Jung Chang, New Taipei (TW)

(73) Assignees: DEXIN ELECTRONIC LTD., Dongguan, Guangdong (CN); DEXIN CORPORATION, New Taipei (TW)

( * ) Notice: Subject to any disclaimer, the term of this patent is extended or adjusted under 35 U.S.C. 154(b) by 205 days.

(21) Appl. No.: 15/182,781

(22) Filed: Jun. 15, 2016

(65) Prior Publication Data

US 2017/0364165 A1    Dec. 21, 2017

(51) Int. Cl.
| | |
|---|---|
| *G06F 3/0354* | (2013.01) |
| *H02J 50/12* | (2016.01) |
| *H02J 50/40* | (2016.01) |
| *H02J 7/04* | (2006.01) |
| *H02J 7/02* | (2016.01) |

(52) U.S. Cl.
CPC .......... *G06F 3/03543* (2013.01); *H02J 7/025* (2013.01); *H02J 7/042* (2013.01); *H02J 50/12* (2016.02); *H02J 50/40* (2016.02); *G06F 2203/0384* (2013.01)

(58) Field of Classification Search
CPC .................................................. G06F 3/03543
USPC ......................................................... 320/108
See application file for complete search history.

(56) References Cited

U.S. PATENT DOCUMENTS

| | | | | |
|---|---|---|---|---|
| 6,633,155 B1 * | 10/2003 | Liang | ................. | G06F 3/03543 |
| | | | | 320/166 |
| 9,035,881 B2 * | 5/2015 | Chen | ................. | G06F 3/0317 |
| | | | | 345/163 |
| 9,069,463 B2 * | 6/2015 | Chang | ................. | G06F 3/0418 |
| 9,357,046 B2 * | 5/2016 | Park | ................. | H04M 1/24 |
| 9,501,159 B2 * | 11/2016 | Bae | ................. | G06F 3/03543 |
| 2003/0048254 A1 * | 3/2003 | Huang | ................. | G06F 3/03543 |
| | | | | 345/163 |
| 2004/0189246 A1 * | 9/2004 | Bulai | ................. | G06F 3/03543 |
| | | | | 320/108 |
| 2008/0189046 A1 * | 8/2008 | Eliasson | ................. | G01B 11/002 |
| | | | | 702/19 |

(Continued)

*Primary Examiner* — Jerry D Robbins
(74) *Attorney, Agent, or Firm* — Li & Cai Intellectual Property (USA) Office (57) ABSTRACT

Disclosed is a wireless charging mouse, a wireless charging mouse device and a charging method thereof. The wireless charging mouse comprises a wireless power reception circuit, a displacement detecting circuit, a wireless transmission circuit, a charging circuit, a control circuit and a power switching circuit. The wireless power reception circuit wirelessly receives an electromagnetic energy. The displacement detecting circuit detects whether the wireless charging mouse is moving. The control circuit outputs a displacement detecting signal and a power switching signal according to a detecting result generated by the displacement detecting circuit through the wireless transmission circuit. The power switching circuit receives the power switching signal and adjusts a ratio of an electric energy for working to the wireless charging mouse and an electric energy for charging to the charging circuit.

8 Claims, 6 Drawing Sheets

(56) References Cited

U.S. PATENT DOCUMENTS

| | | | | |
|---|---|---|---|---|
| 2012/0235504 A1* | 9/2012 | Kesler | ............ | H03H 7/40 |
| | | | | 307/104 |
| 2014/0327426 A1* | 11/2014 | Shterzer | ............ | H03K 3/53 |
| | | | | 323/364 |
| 2015/0326059 A1* | 11/2015 | Abu Qahouq | ............ | H02J 7/007 |
| | | | | 320/108 |
| 2015/0331504 A1* | 11/2015 | Chen | ............ | G06F 3/046 |
| | | | | 345/174 |
| 2016/0085322 A1* | 3/2016 | Park | ............ | G06F 1/266 |
| | | | | 345/163 |

* cited by examiner

WIRELESS CHARGING MOUSE, WIRELESS CHARGING MOUSE DEVICE AND CHARGING METHOD THEREOF

BACKGROUND OF THE INVENTION

1. Field of the Invention

The instant disclosure relates to a wireless mouse; in particular, to a wireless mouse can be charged wirelessly, a wireless mouse device using the same and a charging method thereof.

2. Description of Related Art

A user can easily control a cursor on the screen with a mouse. In the early designs, there was a roller configured in the mouse, so that the displacement and moving direction of the cursor on the screen could be determined by mechanically detecting the displacement and moving direction of the mouse by the roller when the user moves the mouse on a plane, such as on a desk. In recent years, the displacement and moving direction of the mouse are detected by an optical mechanism instead of the traditional mechanical roller, which can increase the accuracy of mouse detection. Moreover, as the technology developed, wireless charging technology has also been used in the mouse.

SUMMARY OF THE INVENTION

The instant disclosure provides a wireless charging mouse, and the wireless charging mouse comprises a wireless power reception circuit, a displacement detecting circuit, a wireless transmission circuit, a charging circuit, a control circuit and a power switching circuit. The wireless power reception circuit wirelessly receives an electromagnetic energy generated from a charging board. The displacement detecting circuit detects whether the wireless charging mouse is moving. The control circuit is electrically connected to the wireless power reception circuit, the displacement detecting circuit and the wireless transmission circuit, and outputs a displacement detecting signal and a power switching signal according to a detecting result generated by the displacement detecting circuit through the wireless transmission circuit. The displacement detecting signal is transmitted to an electric device through the wireless transmission circuit. The power switching circuit is electrically connected to the control circuit and receives the power switching signal. Also, the power switching circuit adjusts a ratio dividing the electromagnetic energy into an electric energy for working provided to the wireless charging mouse and an electric energy for charging provided to the charging circuit according to the power switching signal.

The instant disclosure further provides a wireless charging mouse device, and the wireless charging mouse device comprises a charging board and a wireless charging mouse. The charging board wirelessly transmits an electromagnetic energy, and comprises a power supply circuit and a plurality of wireless power transmission circuits. The power supply circuit is connected to an external power source. Each wireless power transmission circuit is electrically connected to the power supply circuit. The wireless charging mouse comprises a wireless power reception circuit, a displacement detecting circuit, a wireless transmission circuit, a charging circuit, a control circuit and a power switching circuit. The wireless power reception circuit wirelessly receives the electromagnetic energy generated from the charging board. Specifically, the wireless power reception circuit of the wireless charging mouse receives the electromagnetic energy transmitted by each wireless power transmission circuit of the charging board when the wireless power reception circuit of the wireless charging mouse and each wireless power transmission circuit are electromagnetically coupled. The displacement detecting circuit detects whether the wireless charging mouse is moving. The control circuit is electrically connected to the wireless power reception circuit, the displacement detecting circuit and the wireless transmission circuit, and outputs a displacement detecting signal and a power switching signal according to a detecting result generated by the displacement detecting circuit through the wireless transmission circuit. The displacement detecting signal is transmitted to an electric device through the wireless transmission circuit. The power switching circuit is electrically connected to the control circuit and receives the power switching signal. Also the power switching circuit adjusts a ratio dividing the electromagnetic energy into an electric energy for working provided to the wireless charging mouse and an electric energy for charging provided to the charging circuit according to the power switching signal.

The instant disclosure further provides a charging method for a wireless charging mouse. The charging method comprises: receiving an electromagnetic energy generated and wirelessly transmitted from a charging board by the wireless charging mouse; determining whether the wireless charging mouse is moving and generating a power switching signal by a control circuit of the wireless charging mouse; receiving the power switching signal by a power switching circuit of the wireless charging mouse; and adjusting a ratio dividing the electromagnetic energy into an electric energy for working provided to the wireless charging mouse and an electric energy for charging provided to the charging circuit according to the power switching signal by the power switching circuit.

For further understanding of the instant disclosure, reference is made to the following detailed description illustrating the embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

By adjusting electric energy for charging and electric energy for working, the wireless charging mouse provided by the instant disclosure can normally work when moving or stationary. The electric energy for working refers to electric energy the wireless charging mouse needs for working, such as detecting the displacement and moving direction of the mouse, and the electric energy for charging refers to electric energy used to charge the rechargeable battery of the mouse. The wireless charging mouse usually has a larger energy consumption when working than when stationary. Thus, when the wireless charging mouse is moving, the electric energy for working needs to be increased and the electric energy for charging needs to be decreased. On the other hand, when the wireless charging mouse is stationary, the electric energy for working needs to be decreased and the electric energy for charging needs to be increased.

Figure 1:
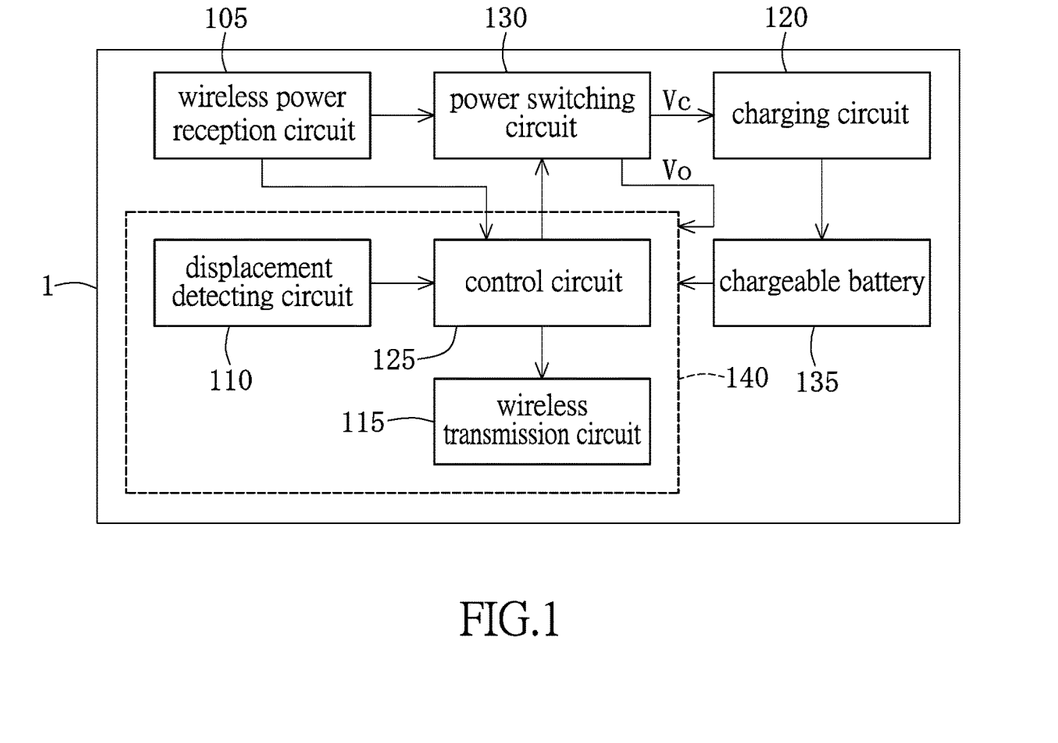
FIG. 1 shows a block diagram of a wireless charging mouse of one embodiment of the instant disclosure.

Refer to FIG. 1. FIG. 1 shows a block diagram of a wireless charging mouse of one embodiment of the instant disclosure. The wireless charging mouse 1 comprises a wireless power reception circuit 105, a displacement detecting circuit 110, a wireless transmission circuit 115, a charging circuit 120, a control circuit 125, a power switching circuit 130 and a rechargeable battery 135. The control circuit 125 is electrically connected to the wireless power reception circuit 105, the displacement detecting circuit 110, the wireless transmission circuit 115 and the power switching circuit 130. The wireless charging mouse 1 comprises an operating circuit 140 that comprises the displacement detecting circuit 110, the wireless transmission circuit 115 and the control circuit 125. The operating circuit 140 receives electric energy provided by the power switching circuit 130 or electric energy provided by the rechargeable battery 135. Additionally, the operating circuit 140 can also comprise circuits to realize an input function as a button, a roller, a touch panel or the like, and it is not limited herein.

The wireless power reception circuit 105 wirelessly receives electromagnetic energy generated by a charging board. This electromagnetic energy can be used as electric energy for the wireless charging mouse 1 charging or working. In detail, the wireless power reception circuit 105 can wirelessly receive electromagnetic energy generated by a charging board when the wireless power reception circuit 105 and the charging board are electromagnetically coupled. For example, the coil of the wireless power reception circuit 105 and the coil of the wireless power transmission circuit of the charging board have the same resonant frequency. In one embodiment, the wireless power reception circuit 105 further comprises an electromagnetic transducer circuit to transform electromagnetic energy to electric energy.

The wireless power reception circuit 105 transmits the electric energy to the power switching circuit 130, and the power switching circuit 130 divides the electric energy into electric energy for working and for charging according to a power switching signal. The power switching circuit 130 can adjust a ratio dividing the electromagnetic energy into electric energy for working and for charging. For example, the power switching circuit 130 can distribute part or all of the electric energy outputted by the wireless power reception circuit 105 to the operating circuit 140 as electric energy for working. On the other hand, the power switching circuit 130 can distribute part or all of the electric energy outputted by the wireless power reception circuit 105 to the charging circuit 120. The charging circuit 120 further transmits the electric energy for charging to the rechargeable battery 135 as stored energy, so that the rechargeable battery 135 can later transmit the stored energy to the operating circuit 140 if necessary.

The displacement detecting circuit 110 is configured to detect the movement of the wireless charging mouse 1. For example, the displacement detecting circuit 110 can detect the displacement and the direction of the movement via optical detection, but it is not limited herein. A light source (not shown) of the displacement detecting circuit 110 may be a laser light or an infrared light to emit a light (an incident light) onto a plane. A receiving unit (not shown) of the displacement detecting circuit 110 can receive a light (a reflected light) reflected by the plane. Based on the difference between the incident light and the reflected light, the displacement and the direction of the movement of the wireless charging mouse 1 can be obtained.

The control circuit 125 is configured to generate a displacement detecting signal and a power switching signal according to a detecting result generated by the displacement detecting circuit 110. The control circuit 125 transmits the displacement detecting signal to an electric device (not shown) through the wireless transmission circuit 115, to control a cursor on screen. The electric device can be a personal computer or a laptop, a wireless communication function provided by the wireless transmission circuit 115 can be based on the Bluetooth communication technology or the radio frequency (RF) communication technology, and the control circuit 125 can be a processor, a controller or any computing circuit; however, it is not limited herein.

When the wireless charging mouse 1 is moving, the control circuit 125 transmits the power switching signal to the power switching circuit 130. The power switching circuit 130 determines to increase the electric energy for working and to decrease the electric energy for charging according to the power switching signal. For example, when the wireless charging mouse 1 is moving, if the rechargeable battery 135 cannot sufficiently provide the electric energy that the operating circuit 140 requires for working normally or working at full speed, by increasing the electric energy for working and decreasing the electric energy for charging, the operating circuit 140 can obtain enough electric energy mostly or entirely outputted from the power switching circuit 130. On the other hand, when the wireless charging mouse 1 is stationary, the control circuit 125 also transmits a power switching signal to the power switching circuit 130. However, in this situation, according to the power switching signal, the power switching circuit 130 determines to decrease the electric energy for working and to increase the electric energy for charging. For example, when the wireless charging mouse 1 is stationary, if the rechargeable battery 135 can sufficiently provide the electric energy required by the operating circuit 140, by decreasing the electric energy for working and increasing the electric energy for charging, the operating circuit 140 obtains enough electric energy mostly or entirely provided by the rechargeable battery 135, and the rechargeable battery 135 can be charged more quickly.

In one embodiment, the power switching circuit 130 can be a buck-boost converter to adjust the electric energy for working and for charging of the wireless charging mouse 1, but it is not limited herein. For example, the buck-boost converter can increase the voltage Vo of the electric energy for working or the voltage Vc of the electric energy for charging. Likewise, the buck-boost converter can also decrease the voltage Vo of the electric energy for working or the voltage Vc of the electric energy for charging.

The following description illustrates how the power switching circuit 130 adjusts the ratio of the electric energy for working provided to the wireless charging mouse and the electric energy for charging provided to the charging circuit. When the wireless charging mouse 1 is stationary, the control circuit 125 generates a power switching signal that distributes 80% of the electric energy outputted from the wireless power reception circuit 105 as the electric energy for charging and 20% of the electric energy outputted from the wireless power reception circuit 105 as the electric energy for working. On the contrary, when the wireless charging mouse 1 is moving, the control circuit 125 generates a power switching signal that distributes 90% of the electric energy outputted from the wireless power reception circuit 105 as the electric energy for working and 10% of the electric energy outputted from the wireless power reception circuit 105 as the electric energy for charging. The different ratios of the electric energy for working provided to the operating circuit and the electric energy for charging provided to the charging circuit can be customized according to the users' experiences.

In one embodiment, when the wireless charging mouse 1 is moving, the control circuit 125 first detects and determines whether the power of the rechargeable battery 135 is larger than a predetermined value before outputting a power switching signal. The predetermined value can be set as 90% of the electric energy that the operating circuit 140 requires for working at full speed. If the control circuit 125 determines that the power of the rechargeable battery 135 is larger than the predetermined value, the control circuit 125 determines not to output a power switching signal to the power switching circuit 130.

Figure 2:
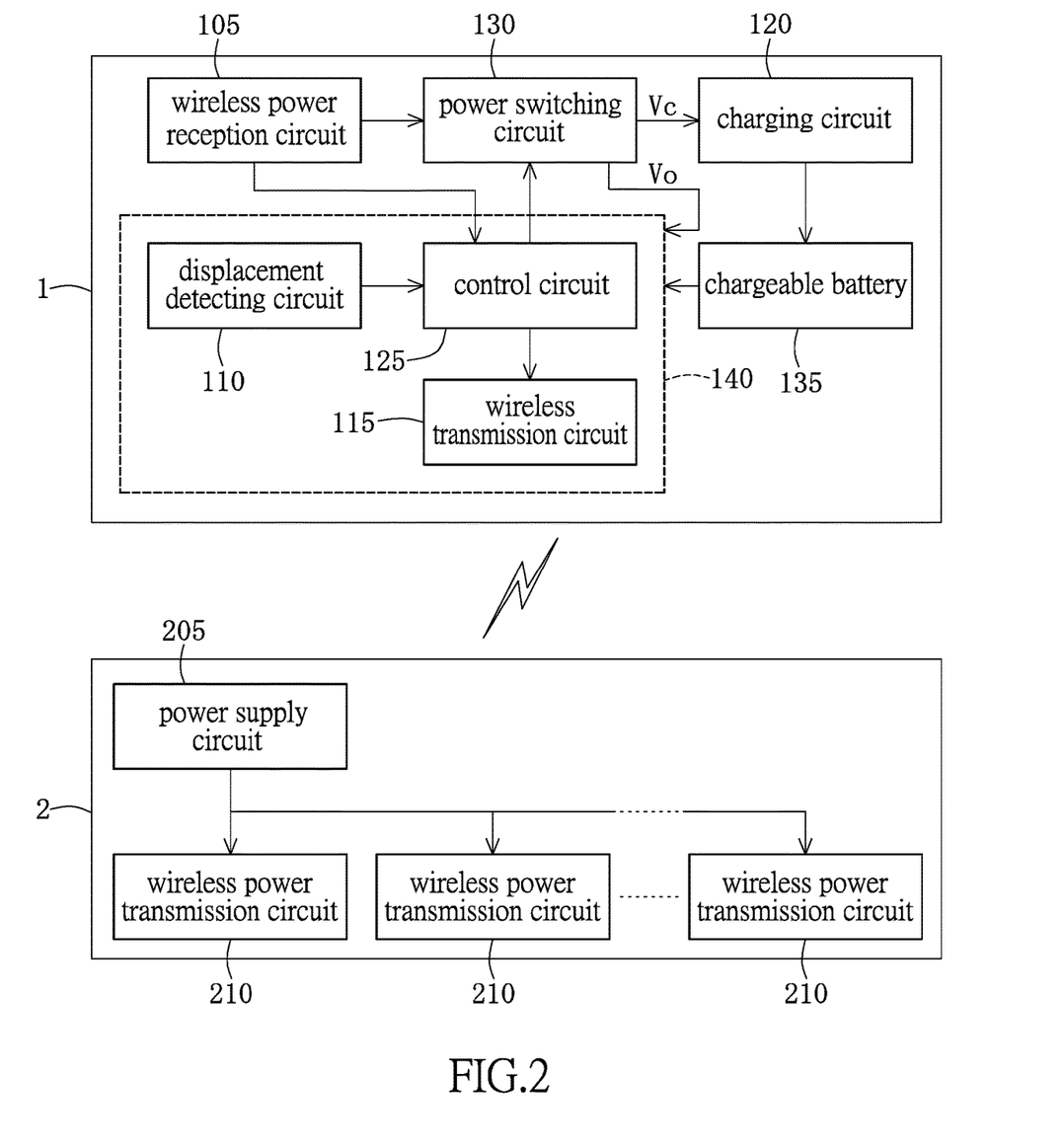
FIG. 2 shows a block diagram of a wireless charging mouse device of one embodiment of the instant disclosure.

Refer to FIG. 2 showing a block diagram of a wireless charging mouse device of one embodiment of the instant disclosure. Compared with the wireless charging mouse 1 shown in FIG. 1, the wireless charging mouse device shown in FIG. 2 additionally comprises a charging board 2. The charging board 2 wirelessly transmits electromagnetic energy to the wireless charging mouse 1. The charging board 2 comprises a power supply circuit 205 and a plurality of wireless power transmission circuits 210, and each wireless power transmission circuit 210 is electrically connected to the power supply circuit 205. Moreover, each wireless power transmission circuit 210 comprises a wireless power transmission module and a magnetic coil. The power supply circuit 205 is electrically connected to an external power source through a connection terminal, wherein the connection terminal can be a Universal Serial Bus (USB) terminal. How to make the wireless power transmission circuit and the wireless power reception circuit electromagnetically coupled is easily understood by those skilled in the art.

The following description illustrates how to determine whether the wireless charging mouse 1 is moving. In one embodiment, the control circuit 125 determines whether the wireless charging mouse 1 is moving according to a variation of data amount of an optical image detected by the displacement detecting circuit 110. For example, the data amount of an optical image can be above the described difference between an incident light that a light source emits, and a light reflected by a plane and received by a receiving unit. In another embodiment, the control circuit 125 can also determine whether the wireless charging mouse 1 is moving according to a variation of the electromagnetic energy received by the wireless power reception circuit 105, and details are illustrated in a later description.

As described, the control circuit 125 determines whether the wireless charging mouse is moving through the displacement detecting circuit 110 and accordingly generates and transmits a power switching signal to the power switching circuit 130. For example, if the control circuit 125 determines that the data amount of an optical image detected by the displacement detecting circuit 110 varies, the control circuit 125 determines that the wireless charging mouse is moving, and the power switching circuit 130 increases the electric energy for working and decreases the electric energy for charging according to a power switching signal generated by the control circuit 125. An increase of the electric energy for working and a decrease of the electric energy for charging are for when the electric energy required by the operating circuit 140 when the wireless charging mouse 1 is moving is larger than the electric energy required by the charging circuit 120. Also, the increase of the electric energy for working and the decrease of the electric energy for charging indicate that the voltage $V_C$ of the electric energy for charging may be less than the voltage $V_O$ of the electric energy for working. On the other hand, if there is no variation of the data amount of an optical image detected by the displacement detecting circuit 110, the control circuit 125 determines that the wireless charging mouse is stationary, and the power switching circuit 130 decreases the electric energy for working and increases the electric energy for charging according to a power switching signal generated by the control circuit 125. The electric energy required by the operating circuit 140 when the wireless charging mouse 1 is stationary is less than the electric energy required by the charging circuit 120, so the electric energy for working is decreased and the electric energy for charging is increased. Moreover, the decrease of the electric energy for working and the increase of the electric energy for charging indicate that the voltage $V_C$ of the electric energy for charging may be larger than the voltage $V_O$ of the electric energy for working.

Figure 3:
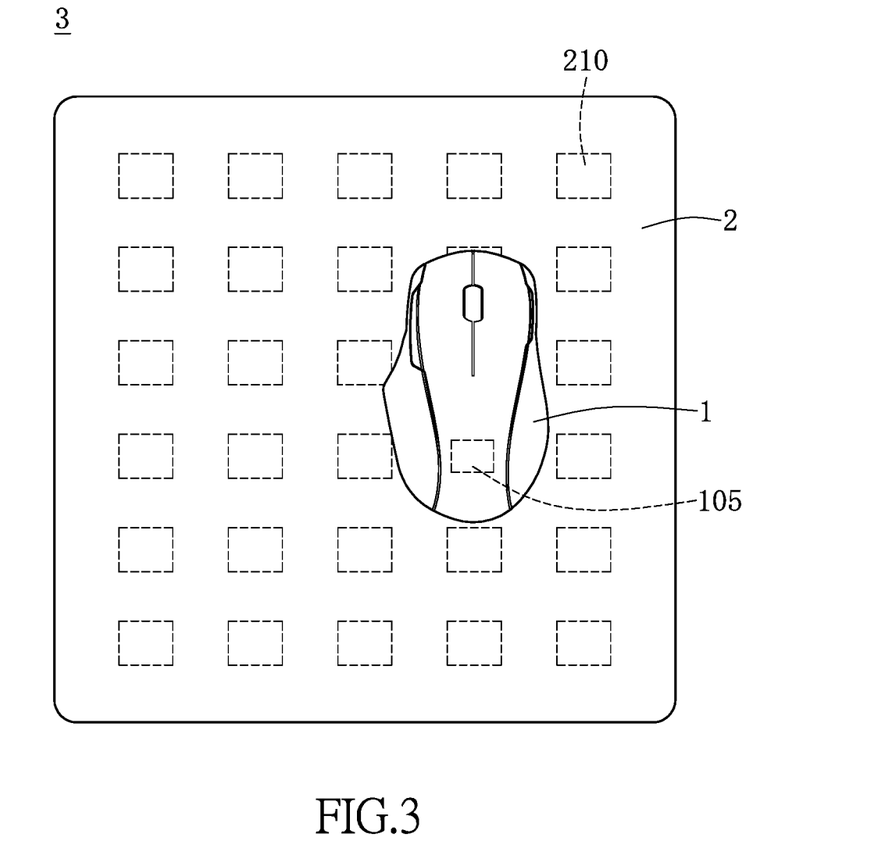
FIG. 3 and FIG. 4 show schematic diagrams of a wireless charging mouse device of one embodiment of the instant disclosure.

Refer to FIG. 2 and FIG. 3. FIG. 3 shows a schematic diagram of a wireless charging mouse device of one embodiment of the instant disclosure. The charging board 2 shown in FIG. 3 has a plurality of wireless power transmission circuits 210, and the wireless charging mouse 1 on the charging board 2 can be charged no matter whether it is moving or stationary. For example, when a user only clicks the left button or the right button or rolls the roller of the wireless charging mouse 1 but does not move the wireless charging mouse 1, the control circuit 125 can determine that the wireless charging mouse 1 is not moving according to the detection result generated by the displacement detecting circuit 110. Thus, a power switching signal generated by the control circuit 125 makes the power switching circuit 130 increase the electric energy for charging and decrease the electric energy for working. In this manner, the electromagnetic energy received by the wireless charging mouse 1 from the charging board 2 is mostly or entirely used as the electric energy for charging. On the other hand, when a user is moving the wireless charging mouse 1 on the charging board 2, the control circuit 125 can determine that the wireless charging mouse 1 is moving according to the detection result generated by the displacement detecting circuit 110. Thus, a power switching signal generated by the control circuit 125 makes the power switching circuit 130 increase the electric energy for working and decrease the electric energy for charging. In this manner, the electromagnetic energy received by the wireless charging mouse 1 from the charging board 2 is mostly or entirely used as the electric energy for working. The amount of the wireless power transmission circuits of the charging board 2 and the position wherein the wireless power transmission circuits of the charging board 2 are configured shown in FIG. 3 are for illustration but not restricting the instant disclosure.

Figure 4:
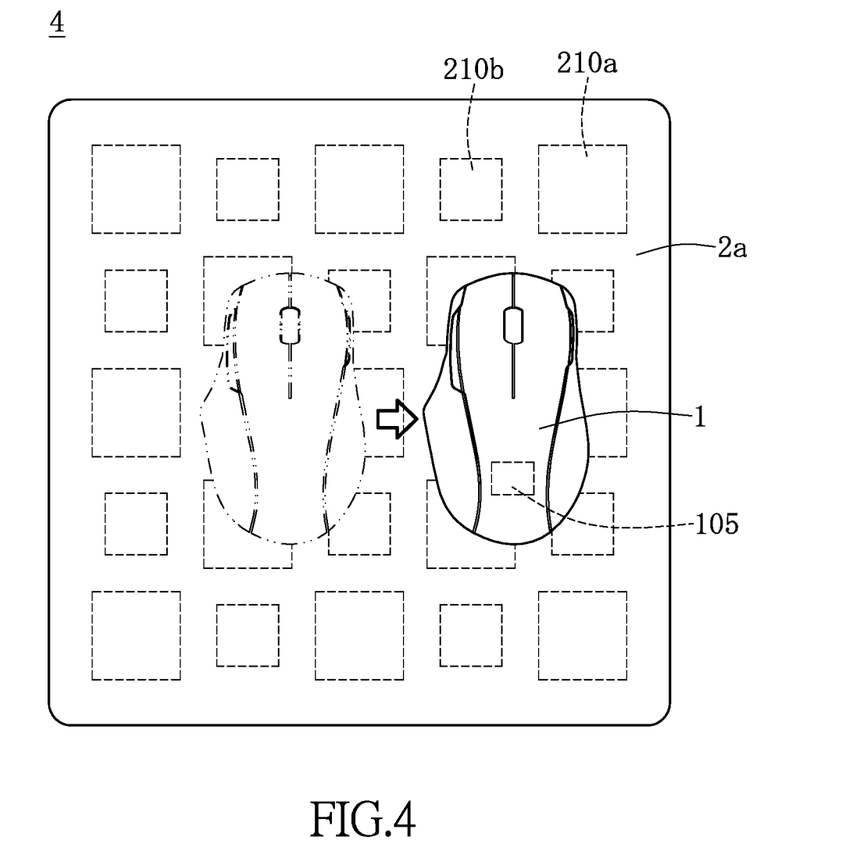

Refer to FIG. 2 and FIG. 4. FIG. 4 shows a schematic diagram of a wireless charging mouse device of one embodiment of the instant disclosure. The configuration of the wireless power transmission circuits of the charging board 2 shown in FIG. 3 and the configuration of the wireless power transmission circuits of the charging board 2 shown in FIG.

4 are different. As shown in FIG. 4, there are a plurality of wireless power transmission circuits 210a and 210b configured on the charging board 2a. The wireless power transmission circuit 210a and the wireless power transmission circuit 210b have different circuit areas, and the wireless power transmission circuits 210a are separated from each other by the wireless power transmission circuits 210b. The wireless power transmission circuit 210a has a larger circuit area, so compared with the wireless power transmission circuit 210b, the wireless power transmission circuit 210a can provide a larger electromagnetic energy to the wireless charging mouse 1. Specifically speaking, the wireless charging mouse 1 shown in FIG. 4 determines that the wireless charging mouse 1 is moving according to a variation of the electromagnetic energy generated by the charging board 2a and received by the wireless power reception circuit 105. On the other hand, the wireless charging mouse 1 shown in FIG. 4 determines that the wireless charging mouse 1 is stationary when the electromagnetic energy generated by the charging board 2a and received by the wireless power reception circuit 105 does not vary. For example, when the wireless charging mouse 1 moves from wireless power transmission circuit 210a to wireless power transmission circuit 210b, or vice versa, the electromagnetic energy generated by the charging board 2a and received by the wireless power reception circuit 105 varies. Thus, the control circuit 125 learns that the electromagnetic energy received by the wireless power reception circuit 105 varies. For example, when the electromagnetic energy received by the wireless power reception circuit 105 varies from a first electromagnetic energy to a second electromagnetic energy, the control circuit 125 determines that the wireless charging mouse 1 is moving. On the other hand, if the wireless charging mouse 1 stays stationary at one of the wireless power transmission circuits 210a or at one of the wireless power transmission circuit 210b, the control circuit 125 learns that the electromagnetic energy received by the wireless power reception circuit 105 is constant. Thus, the control circuit 125 determines that the wireless charging mouse 1 is not moving.

After the wireless charging mouse 1 determines whether there is a variation of the electromagnetic energy received by the wireless power reception circuit 105, details about how to adjust the ratio that dividing the electromagnetic energy into the electric energy for working provided to the operating circuit 140 and the electric energy for charging provided to the charging circuit 120 are similar to the above embodiments, and thus the redundant information is not repeated. However, it is worth mentioning that, in one embodiment, after the control circuit 125 learns that the electromagnetic energy received by the wireless power reception circuit 105 varies, the control circuit 125 further determines whether the variation of the electromagnetic energy happened during a predetermined time and accordingly decides whether to adjust a report rate of the wireless charging mouse 1. For example, if the electromagnetic energy received by the wireless power reception circuit 105 of the wireless charging mouse 1 varies from the first electromagnetic energy to the second electromagnetic energy during the predetermined time, it indicates that the wireless charging mouse 1 is moving quickly. Thus, the control circuit 125 adjusts the report rate of the wireless charging mouse 1 from a first report rate to a second report rate, wherein the second report rate is larger than the first report rate such that the wireless charging mouse 1 can respond every input signal promptly.

Figure 5:
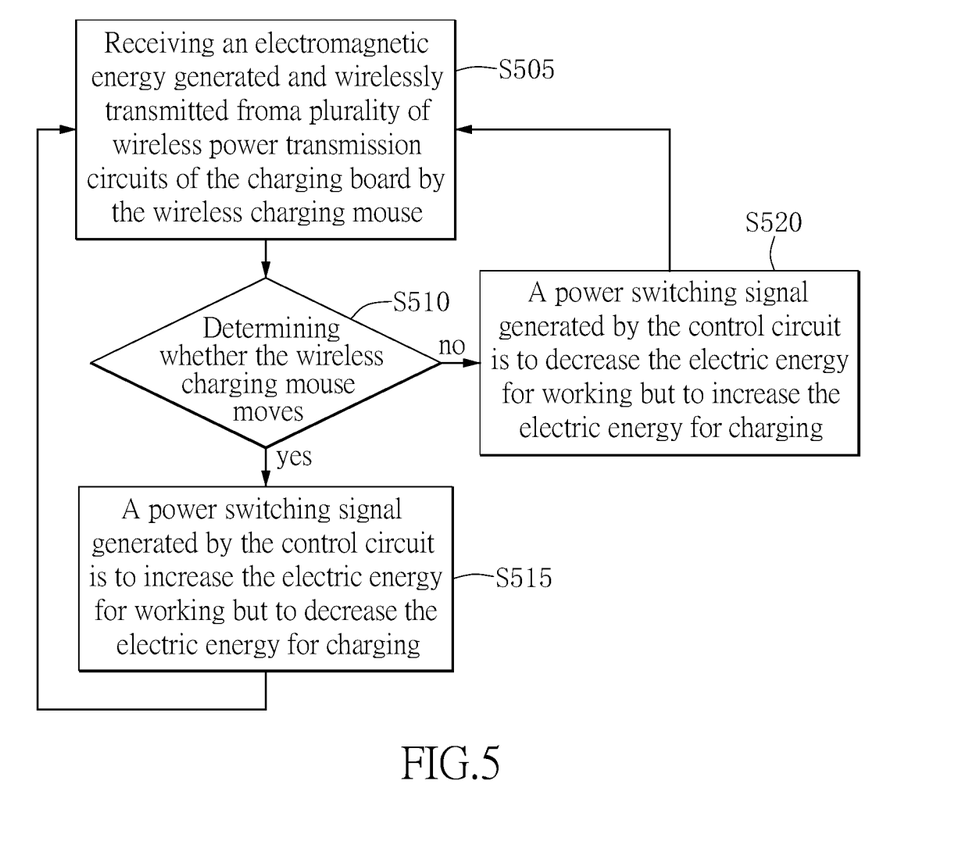
FIG. 5 shows a flow chart of a charging method for a wireless charging mouse of one embodiment of the instant disclosure.

Refer to FIG. 5. FIG. 5 shows a flow chart of a charging method for a wireless charging mouse of one embodiment of the instant disclosure. In conjunction with FIG. 2 and FIG. 5, in step S505, the wireless charging mouse 1 receives the electromagnetic energy generated from a plurality of wireless power transmission circuits 210 on the charging board 2.

When one of the wireless power transmission circuits 210 on the charging board 2 is electromagnetically coupled to the wireless power reception circuit 105 of the wireless charging mouse 1, the wireless power reception circuit 105 of the wireless charging mouse 1 can receive an electromagnetic energy transmission by the wireless power transmission circuits 210 on the charging board 2.

In step S510, the control circuit determines whether the wireless charging mouse 1 is moving. The control circuit 125 determines whether the wireless charging mouse 1 is moving, for example, according to a variation of the electromagnetic energy or a variation of the data amount of an optical image, and the details are as described in the above embodiments and not repeated herein. If the control circuit 125 determines that the wireless charging mouse 1 is moving, it goes to step S515, otherwise it goes to S520.

In step S515, the power switching signal generated by the control circuit 125 may make the power switching circuit 130 increase the electric energy for working and decrease the electric energy for charging. In this case, it indicates that the operating circuit 140 of the wireless charging mouse 1 needs more electric energy, so the control circuit 125 increases the electric energy for working provided to the operating circuit 140 such that the wireless charging mouse 1 can work normally or even work with a full speed.

In step S520, the control circuit 125 generates a power switching signal to make the power switching circuit 130 increase the electric energy for charging and decrease the electric energy for working. In this case, it indicates that the operating circuit 140 of the wireless charging mouse 1 only needs a small amount of electric energy for working when the wireless charging mouse 1 is stationary. Thus, the control circuit 125 increases the electric energy for charging provided to the charging circuit 120 to speed up the charging of the rechargeable battery 135, and the wireless charging mouse 1 can still work normally.

Briefly, in this embodiment, according to a power switching signal, the power switching circuit 130 adjusts a ratio by which the power switching circuit 130 divides an electromagnetic energy into an electric energy for working provided to the operating circuit 140 of the wireless charging mouse 1 and an electric energy for charging provided to the charging circuit 120 of the wireless charging mouse 1. In addition, the control circuit 125 determines whether the wireless charging mouse 1 is moving and accordingly transmits different power switching signals to make the power switching circuit 130 adjust the ratio of the energy for working provided to the operating circuit 140 of the wireless charging mouse 1 and the electric energy for working provided to the charging circuit 120 of the wireless charging mouse 1. As a result, the wireless charging mouse 1 can work normally no matter whether it is moving or stationary.

Figure 6:
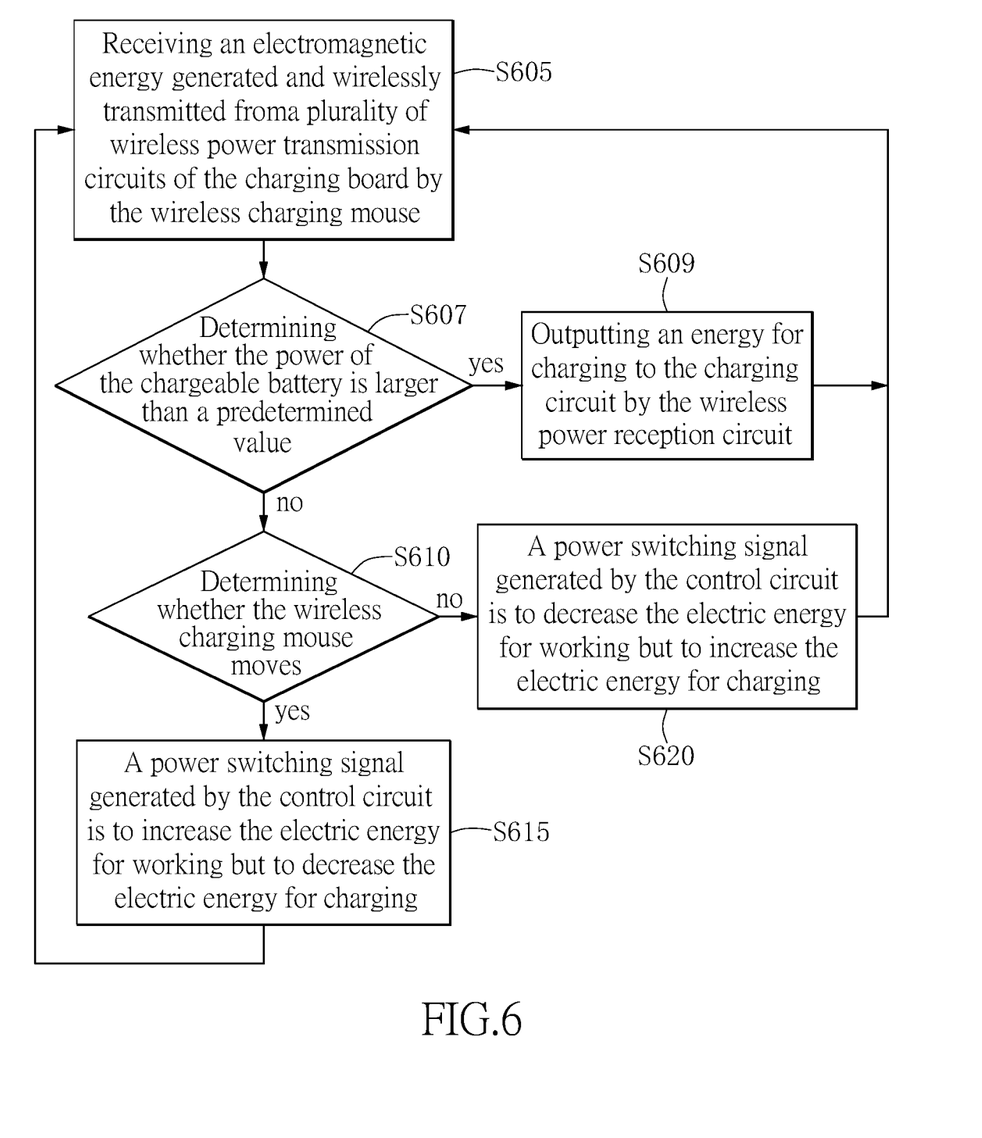
FIG. 6 shows a flow chart of a charging method for a wireless charging mouse of another embodiment of the instant disclosure.

Refer to FIG. 6, showing a flow chart of a charging method for a wireless charging mouse of another embodiment of the instant disclosure. Compared with FIG. 5, there is a step of determining whether the power of the rechargeable battery is larger than a predetermined value added in the charging method shown in FIG. 6.

Refer to FIG. 2 and FIG. 6. In step S605, the wireless charging mouse 1 receives an electromagnetic energy generated by a plurality of wireless power transmission circuits 210 on the charging board 2. The wireless power reception circuit 105 of the wireless charging mouse 1 can receive an electromagnetic energy generated by one of the wireless power transmission circuits 210 on the charging board 2.

In step S607, the control circuit determines whether the power of the rechargeable battery 135 of the wireless charging mouse 1 is larger than a predetermined value. If yes, it goes to step S609, otherwise it goes to step S610. In step S609, the wireless power reception circuit 105 outputs electric energy only to the charging circuit 120.

In step S610, the control circuit 125 determines whether the wireless charging mouse 1 is moving. The control circuit 125 determines whether the wireless charging mouse 1 is moving, for example, according to a variation of the electromagnetic energy or a variation of the data amount of an optical image. If the wireless charging mouse 1 is moving, it goes to step S615, and otherwise it goes to step S620.

In step S615, the power switching signal generated by the control circuit 125 is to make the power switching circuit 135 increase the electric energy for working provided to the operating circuit 140 and decrease the electric energy for charging provided to the charging circuit 120.

In step S620, the power switching signal 130 generated by the control circuit 125 is to make the power switching circuit 130 increase the electric energy for charging provided to the charging circuit 120 and decrease the electric energy for working provided to the operating circuit 140.

In this embodiment, instead of dividing the electric energy into two parts for the operating circuit 140 and the charging circuit 120 according to a certain ratio, the wireless power reception circuit 102 outputs the electric energy only to the operating circuit 140 when the control circuit 125 determines that the power of the rechargeable battery 135 is larger than a predetermined value. In other words, there is no power switching signal generated by the control circuit 125. On the other hand, when the control circuit 125 determines that the power of the rechargeable battery 135 is less than the predetermined value, the control circuit 125 generates a power switching signal after determining whether the wireless charging mouse 1 is moving, to distribute the electric energy as the electric energy for working for the operating circuit 140 and as the electric energy for charging for the charging circuit 120.

To sum up, the wireless charging mouse, the wireless charging mouse device using the same and the wireless charging method thereof provide an electric energy distribution function. A control circuit generates a power switching signal according to whether the wireless charging mouse is moving. The wireless charging mouse adjusts a ratio of electric energy for working outputted by the wireless power reception circuit to the wireless charging mouse and electric energy for charging outputted by the wireless power reception circuit to the charging circuit according to the power switching signal. Thereby, the electric energy can be effectively used. Moreover, even if the wireless charging mouse is working at full speed, it will not stop working because the power of its rechargeable battery runs out. The wireless charging mouse provided by the instant disclosure can work normally no matter if it is moving with a normal speed or a full speed, or it is stationary.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A wireless charging mouse, comprising:
a wireless power reception circuit, wirelessly receiving an electromagnetic energy generated from a charging board;
a displacement detecting circuit, detecting whether the wireless charging mouse is moving;
a wireless transmission circuit;
a charging circuit;
a control circuit, electrically connected to the wireless power reception circuit, the displacement detecting circuit and the wireless transmission circuit, outputting a displacement detecting signal and a power switching signal according to a detecting result generated by the displacement detecting circuit, wherein the displacement detecting signal is transmitted to an electric device through the wireless transmission circuit; and
a power switching circuit, electrically connected to the control circuit, receiving the power switching signal, adjusting a ratio dividing the electromagnetic energy into an electric energy for working provided to the wireless charging mouse and an electric energy for charging provided to the charging circuit according to the power switching signal;
wherein the power switching signal generated by the control circuit when the wireless charging mouse moves increases the electric energy for working but decreases the electric energy for charging; and
wherein when the control circuit detects and determines that a power level of a rechargeable battery is higher than a predetermined value, the control circuit does not output the power switching signal to the power switching circuit, wherein the predetermined value is set as a percentage of an electric energy that the wireless charging mouse requires for working at full speed;
wherein when the wireless charging mouse is stationary, the control circuit generates the power switching signal that distributes a first percentage of the electric energy outputted from the wireless power reception circuit as the electric energy for charging and a second percentage of the electric energy outputted from the wireless power reception circuit as the electric energy for working, where the first electric energy is larger than the second electric energy;
wherein when the wireless charging mouse is moving, the control circuit generates the power switching signal that distributes a third percentage of the electric energy outputted from the wireless power reception circuit as the electric energy for working and a fourth percentage of the electric energy outputted from the wireless power reception circuit as the electric energy for charging, where the third electric energy is larger than the fourth electric energy;
wherein the control circuit adjusts a report rate of the wireless charging mouse when the control circuit determines that the electromagnetic energy received by the wireless power reception circuit varies;
wherein the control circuit determines whether the wireless charging mouse is moving according to a variation of the electromagnetic energy received by the wireless power reception circuit;
wherein the control circuit adjusts the report rate of the wireless charging mouse from a first report rate to a second report rate when the control circuit determines that the electromagnetic energy received by the wireless power reception circuit varies from a first electromagnetic energy to a second electromagnetic energy during a predetermined time, wherein the second report rate is larger than the first report rate.

2. The wireless charging mouse according to claim 1, wherein the control circuit determines whether the wireless charging mouse is moving according to a variation of data amount of an optical image detected by the displacement detecting circuit.

3. A wireless charging mouse device, comprising:
a charging board, wirelessly transmitting an electromagnetic energy, comprising:
  a power supply circuit, connected to an external power source; and
  a plurality of wireless power transmission circuits, each wireless power transmission circuit electrically connected to the power supply circuit; and
a wireless charging mouse, comprising:
  a wireless power reception circuit, wirelessly receiving the electromagnetic energy generated from the charging board, wherein the wireless power reception circuit of the wireless charging mouse receives the electromagnetic energy transmitted by each wireless power transmission circuit of the charging board when the wireless power reception circuit of the wireless charging mouse and each wireless power transmission circuit are electromagnetically coupled;
  a displacement detecting circuit, detecting whether the wireless charging mouse is moving;
  a wireless transmission circuit;
  a charging circuit;
  a control circuit, electrically connected to the wireless power reception circuit, the displacement detecting circuit and the wireless transmission circuit, outputting a displacement detecting signal and a power switching signal according to a detecting result generated by the displacement detecting circuit, wherein the displacement detecting signal is transmitted to an electric device through the wireless transmission circuit; and
  a power switching circuit, electrically connected to the control circuit, receiving the power switching signal, adjusting a ratio dividing the electromagnetic energy into an electric energy for working provided to the wireless charging mouse and an electric energy for charging provided to the charging circuit according to the power switching signal;
wherein the power switching signal generated by the control circuit when the wireless charging mouse moves increases the electric energy for working but decreases the electric energy for charging;
wherein when the control circuit detects and determines that a power level of a rechargeable battery is higher than a predetermined value, the control circuit does not output the power switching signal to the power switching circuit, wherein the predetermined value is set as a percentage of an electric energy that the wireless charging mouse requires for working at full speed;
wherein when the wireless charging mouse is stationary, the control circuit generates the power switching signal that distributes a first percentage of the electric energy outputted from the wireless power reception circuit as the electric energy for charging and a second percentage of the electric energy outputted from the wireless power reception circuit as the electric energy for working, where the first electric energy is larger than the second electric energy;
wherein when the wireless charging mouse is moving, the control circuit generates the power switching signal that distributes a third percentage of the electric energy outputted from the wireless power reception circuit as the electric energy for working and a fourth percentage of the electric energy outputted from the wireless power reception circuit as the electric energy for charging, where the third electric energy is larger than the fourth electric energy;
wherein the control circuit adjusts a report rate of the wireless charging mouse when the control circuit determines that the electromagnetic energy received by the wireless power reception circuit varies;
wherein the control circuit determines whether the wireless charging mouse is moving according to a variation of the electromagnetic energy received by the wireless power reception circuit, wherein the variation of the electromagnetic energy is caused by different electromagnetic energies transmitted by adjacent wireless power transmission circuits having different circuit areas;
wherein the control circuit adjusts the report rate of the wireless charging mouse from a first report rate to a second report rate when the control circuit determines that the electromagnetic energy received by the wireless power reception circuit varies from a first electromagnetic energy to a second electromagnetic energy during a predetermined time, wherein the second report rate is larger than the first report rate.

4. The wireless charging mouse device according to claim 3, wherein the control circuit determines whether the wireless charging mouse is moving according to a variation of data amount of an optical image detected by the displacement detecting circuit.

5. A charging method for a wireless charging mouse, comprising:
receiving an electromagnetic energy generated and wirelessly transmitted from a charging board by the wireless charging mouse;
determining whether the wireless charging mouse is moving and generating a power switching signal by a control circuit of the wireless charging mouse;
receiving the power switching signal by a power switching circuit of the wireless charging mouse; and
adjusting a ratio dividing the electromagnetic energy into an electric energy for working provided to the wireless charging mouse and an electric energy for charging provided to the charging circuit according to the power switching signal by the power switching circuit;
wherein the power switching signal generated by the control circuit when the wireless charging mouse moves increases the electric energy for working but decreases the electric energy for charging;
wherein when the control circuit detects and determines that a power level of a rechargeable battery is higher than a predetermined value, the control circuit does not output the power switching signal to the power switching circuit, wherein the predetermined value is set as a percentage of an electric energy that the wireless charging mouse requires for working at full speed;
wherein when the wireless charging mouse is stationary, the control circuit generates the power switching signal that distributes a first percentage of the electric energy outputted from the wireless power reception circuit as the electric energy for charging and a second percentage of the electric energy outputted from the wireless power reception circuit as the electric energy for working, where the first electric energy is larger than the second electric energy;

wherein when the wireless charging mouse is moving, the control circuit generates the power switching signal that distributes a third percentage of the electric energy outputted from the wireless power reception circuit as the electric energy for working and a fourth percentage of the electric energy outputted from the wireless power reception circuit as the electric energy for charging, where the third electric energy is larger than the fourth electric energy;

wherein the control circuit adjusts a report rate of the wireless charging mouse when the control circuit determines that the electromagnetic energy received by the wireless power reception circuit varies;

wherein the control circuit determines whether the wireless charging mouse is moving according to a variation of the electromagnetic energy received by the wireless power reception circuit;

wherein the control circuit adjusts the report rate of the wireless charging mouse from a first report rate to a second report rate when the control circuit determines that the electromagnetic energy received by the wireless power reception circuit varies from a first electromagnetic energy to a second electromagnetic energy during a predetermined time, wherein the second report rate is larger than the first report rate.

6. The charging method for the wireless charging mouse according to claim 5, wherein the power switching signal generated by the control circuit when the wireless charging mouse does not move decreases the electric energy for working but increases the electric energy for charging.

7. The charging method for the wireless charging mouse according to claim 6, wherein the control circuit determines whether the wireless charging mouse is moving according to a variation of data amount of an optical image detected by the displacement detecting circuit.

8. The charging method for the wireless charging mouse according to claim 5, wherein before the step of determining whether the wireless charging mouse moves, further comprising:

determining whether the power level of the rechargeable battery of the wireless charging mouse is higher than the predetermined value, wherein a wireless power reception circuit of the wireless charging mouse only outputs the electric energy for charging to the charging circuit if the power level of the rechargeable battery of the wireless charging mouse is higher than the predetermined value.

* * * * *